(12) United States Patent
Sanders et al.

(10) Patent No.: US 11,522,783 B2
(45) Date of Patent: Dec. 6, 2022

(54) NETWORK TOPOLOGY DISCOVERY

(71) Applicant: NOBLIS, INC., Reston, VA (US)

(72) Inventors: Mark Jason Sanders, Reston, VA (US); Denise Michelle Masi, Burke, VA (US); Eric Richard McCabe, Reston, VA (US); Erica Jean Maciejewski, Arlington, VA (US); Nathan Scott Dellinger, Aldie, VA (US); Daniel Antonio Negrón, Annandale, VA (US)

(73) Assignee: NOBLIS, INC., Reston, VA (US)

( * ) Notice: Subject to any disclaimer, the term of this patent is extended or adjusted under 35 U.S.C. 154(b) by 208 days.

(21) Appl. No.: 17/123,917

(22) Filed: Dec. 16, 2020

(65) Prior Publication Data
US 2021/0184961 A1 Jun. 17, 2021

Related U.S. Application Data

(60) Provisional application No. 62/949,166, filed on Dec. 17, 2019.

(51) Int. Cl.
*H04L 45/02* (2022.01)

(52) U.S. Cl.
CPC .................. *H04L 45/02* (2013.01)

(58) Field of Classification Search
CPC ....... H04L 45/02; H04L 45/03; H04L 45/033; H04L 45/037; H04L 45/03777
USPC ........................................................ 370/254
See application file for complete search history.

(56) References Cited

U.S. PATENT DOCUMENTS

| 5,940,376 | A | * | 8/1999 | Yanacek | ............ | H04Q 11/0478 370/254 |
| 6,069,895 | A | * | 5/2000 | Ayandeh | ............ | H04Q 11/0478 370/399 |
| 2006/0221954 | A1 | * | 10/2006 | Narayan | ............... | H04L 45/306 370/389 |
| 2014/0362709 | A1 | * | 12/2014 | Kashyap | ................. | H04L 43/04 370/255 |

(Continued)

OTHER PUBLICATIONS

Archipelago (Ark) Measurement Infrastructure located at https://web.archive.org/web/20191216030726/https://www.caida.org/projects/ark/ visited on Dec. 16, 2019; 4 pages.

(Continued)

*Primary Examiner* — Anthony Mejia
(74) *Attorney, Agent, or Firm* — Morrison & Foerster LLP

(57) ABSTRACT

The present disclosure relates to capturing the routing topology of a network (e.g., the Internet covering the entire IPv4 address space). An exemplary method comprises: obtaining a first bit array indicative of a plurality of target IP addresses; assigning a first subset of the plurality of target IP addresses to a first source device; assigning a second subset of the plurality of target IP addresses to a second source device; causing the first source device to transmit a first plurality of probing packets to the first subset of the plurality of target IP addresses and receive a first plurality of returned packets, causing the second source device to transmit a second plurality of probing packets to the second subset of the plurality of target IP addresses and receive a second plurality of returned packets, and generating a data structure representing a routing topology of the network.

20 Claims, 10 Drawing Sheets

(56) References Cited

U.S. PATENT DOCUMENTS

| | | | | |
|---|---|---|---|---|
| 2015/0222448 A1* | 8/2015 | Banavalikar | .......... | H04L 49/351 370/254 |
| 2017/0048128 A1* | 2/2017 | Perkinson | ............... | H04L 45/48 |
| 2017/0213601 A1* | 7/2017 | Shao | ...................... | G06F 11/27 |

OTHER PUBLICATIONS

Beverly, "Yarrp'ing the Internet: Randomized High-Speed Active Topology Discovery," IMC 2016, Nov. 14-16, 2016, Santa Monica, CA; 8 pages.

DHS CISA Alert TA18-106A. (Apr. 20, 2018). "Russian State-Sponsored Cyber Actors Targeting Network Infrastructure Devices," located at <https://us-cert.cisa.gov/ncas/alerts/TA18-106A?utm_source=newsletter&utm_medium=email&utm_campaign=kremlin_watch_briefing_british_parliament_moves_toward_a_more_coordinated_investigation&utm_term=2019-03-16> visited on Feb. 11, 2021; 15 pages.

Koch et al. (2013). "Advanced Geolocation of IP Addresses," International Journal of Electrical and Computer Engineering 7(8): 10 pages.

* cited by examiner

Bit Array (target/non-target)

| IP Addr 1 | IP Addr 2 | IP Addr 3 | IP Addr 4 | ... | IP Addr M |
|---|---|---|---|---|---|
| 0/1 | 0/1 | 0/1 | 0/1 | ... | 0/1 |

| IP Addr 1 | IP Addr 2 | IP Addr 3 | IP Addr 4 | ... | IP Addr M |
|---|---|---|---|---|---|
| 0/1 | 0/1 | 0/1 | 0/1 | ... | 0/1 |

Bit Array (router/non-router) 204

602 OBTAINING A FIRST BIT ARRAY INDICATIVE OF A PLURALITY OF TARGET IP ADDRESSES, WHEREIN THE PLURALITY OF TARGET IP ADDRESSES IS A SUBSET OF A PLURALITY OF IP ADDRESSES IN THE NETWORK, WHEREIN THE FIRST BIT ARRAY COMPRISES A PLURALITY OF BINARY VALUES CORRESPONDING TO THE PLURALITY OF IP ADDRESSES IN THE NETWORK, AND WHEREIN EACH BINARY VALUE IS INDICATIVE OF WHETHER A CORRESPONDING IP ADDRESSES IS A TARGET IP ADDRESS

604 ASSIGNING A FIRST SUBSET OF THE PLURALITY OF TARGET IP ADDRESSES TO A FIRST SOURCE DEVICE OF A SET OF SOURCE DEVICES BY PROVIDING A FIRST SOURCE-SPECIFIC VERSION OF THE FIRST BIT ARRAY TO THE FIRST SOURCE DEVICE

606 ASSIGNING A SECOND SUBSET OF THE PLURALITY OF TARGET IP ADDRESSES TO A SECOND SOURCE DEVICE OF THE SET OF SOURCE DEVICES BY PROVIDING A SECOND SOURCE-SPECIFIC VERSION OF THE FIRST BIT ARRAY TO THE SECOND SOURCE DEVICE

608 CAUSING THE FIRST SOURCE DEVICE TO TRANSMIT A FIRST PLURALITY OF PROBING PACKETS TO THE FIRST SUBSET OF THE PLURALITY OF TARGET IP ADDRESSES AND RECEIVE A FIRST PLURALITY OF RETURNED PACKETS

610 CAUSING THE SECOND SOURCE DEVICE TO TRANSMIT A SECOND PLURALITY OF PROBING PACKETS TO THE SECOND SUBSET OF THE PLURALITY OF TARGET IP ADDRESSES AND RECEIVE A SECOND PLURALITY OF RETURNED PACKETS

612 BASED ON THE FIRST PLURALITY OF RETURNED PACKETS AND THE SECOND PLURALITY OF RETURNED PACKETS, GENERATING A DATA STRUCTURE REPRESENTING A ROUTING TOPOLOGY OF THE NETWORK

652 TRANSMITTING, FROM A SOURCE DEVICE, A FIRST PROBING PACKET AND A SECOND PROBING PACKET TO A TARGET IP ADDRESS, WHEREIN THE FIRST PROBING PACKET IS ASSOCIATED WITH A FIRST TIME-TO-LIVE VALUE AND WHEREIN THE SECOND PROBING PACKET IS ASSOCIATED WITH A SECOND TIME-TO-LIVE VALUE

654 RECEIVING, AT THE SOURCE DEVICE, A FIRST RETURNED PACKET CORRESPONDING TO THE FIRST PROBING PACKET AND A SECOND RETURNED PACKET CORRESPONDING TO THE SECOND PROBING PACKET

656 CONSTRUCTING A BYTE ARRAY BASED ON THE FIRST RETURNED PACKET AND THE SECOND RETURNED PACKET, WHEREIN THE BYTE ARRAY COMPRISES A SUBARRAY, AND WHEREIN THE SUBARRAY COMPRISES A FIELD INDICATIVE OF THE SOURCE DEVICE, A FIELD INDICATIVE OF AN IP ADDRESS ASSOCIATED WITH THE FIRST RETURNED PACKET, AND A FIELD INDICATIVE OF AN IP ADDRESS ASSOCIATED WITH THE SECOND RETURNED PACKET

658 BASED ON THE BYTE ARRAY, CONSTRUCTING A BIT ARRAY, WHEREIN THE BIT ARRAY COMPRISES A PLURALITY OF BINARY VALUES CORRESPONDING TO A PLURALITY OF IP ADDRESSES IN THE NETWORK, AND WHEREIN EACH BINARY VALUE IS INDICATIVE OF WHETHER A CORRESPONDING IP ADDRESSES IS A ROUTER

FIG. 6B

NETWORK TOPOLOGY DISCOVERY

CROSS-REFERENCE TO RELATED APPLICATIONS

This application claims the priority of U.S. Provisional Application No. 62/949,166, filed Dec. 17, 2019, the entire contents of which are incorporated herein by reference.

FIELD OF THE DISCLOSURE

The present disclosure relates generally to capturing the routing topology of a network (e.g., the Internet covering the entire IPv4 address space) and specifically, to data collection, data processing, and data storage techniques for capturing the routing topology of the network in an efficient manner.

BACKGROUND OF THE DISCLOSURE

Currently, the general physical topology of many large-scale networks, such as the Internet, is not known. The lack of knowledge limits an understanding of ongoing and potential risks in the network and also limits options for reducing and minimizing such risks. For example, cyber analysts are unable to identify attacks staged from routing infrastructure, as it is unknown which IP addresses are routers. There have been a number of high-profile incidents which involved attackers interfering with (e.g., taking over) routers in 2018, resulting in DHS CISA Alert (TA18-106A) "Russian State-Sponsored Cyber Actors Targeting Network Infrastructure Devices."

SUMMARY OF THE DISCLOSURE

As explained above, the topology of many large-scale networks, such as the Internet, is not currently known. Thus, it would be beneficial to obtain information representing the topology of large-scale networks such as the Internet, including the identities of routers and the interconnectivity among the routers.

An exemplary computer-enabled method for obtaining a routing topology of a network, the method comprises: obtaining a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; assigning a first subset of the plurality of target IP addresses to a first source device of a set of source devices by providing a first source-specific version of the first bit array to the first source device; assigning a second subset of the plurality of target IP addresses to a second source device of the set of source devices by providing a second source-specific version of the first bit array to the second source device; causing the first source device to transmit a first plurality of probing packets to the first subset of the plurality of target IP addresses and receive a first plurality of returned packets, causing the second source device to transmit a second plurality of probing packets to the second subset of the plurality of target IP addresses and receive a second plurality of returned packets, and based on the first plurality of returned packets and the second plurality of returned packets, generating a data structure representing a routing topology of the network.

In some embodiments, obtaining the first bit array indicative of the plurality of target IP addresses comprises: determining whether an IP address of the plurality of IP addresses is a reserved address; and updating a binary value corresponding to the IP address in the first bit array based on the determination.

In some embodiments, the first source-specific version of the first bit array comprises an instance of the first bit array and a value indicative of a portion of the first bit array.

In some embodiments, the first source-specific version of the first bit array comprises a modified instance of the first bit array, wherein a subset of the plurality of target IP addresses are indicated in the modified instance of the first bit array.

In some embodiments, the first source device comprises a scanning tool.

In some embodiments, the scanning tool is configured to transmit a first probing packet and a second probing packet of the plurality of probing packets to a target IP address of the first subset of the plurality of target IP addresses in a random order.

In some embodiments, the first probing packet and the second probing packet are associated with successive time-to-live values.

In some embodiments, the first probing packet and the second probing packet are ICMP packets.

In some embodiments, generating the data structure representing the routing topology comprises generating, based on the first plurality of returned packets and the second plurality of returned packets, a byte array representing one or more routing paths of the first plurality of first plurality of returned packets and the second plurality of returned packets.

In some embodiments, generating the data structure representing the routing topology comprises generating a second bit array based on the byte array, wherein the second bit array comprises a plurality of binary values corresponding to respective network nodes of one or more routing paths.

In some embodiments, the method further comprises displaying a visualization of the routing topology over a map interface.

In some embodiments, the method further comprises displaying a plurality of routers identified based on the routing topology.

An exemplary electronic device, comprises: one or more processors; a memory; and one or more programs, wherein the one or more programs are stored in the memory and configured to be executed by the one or more processors, the one or more programs including instructions for: obtaining a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; assigning a first subset of the plurality of target IP addresses to a first source device of a set of source devices by providing a first source-specific version of the first bit array to the first source device; assigning a second subset of the plurality of target IP addresses to a second source device of the set of source devices by providing a second source-specific version of the first bit array to the second source device; causing the first source device to transmit a first plurality of probing packets to the first subset of the plurality of target IP addresses and receive a first plurality of returned packets, causing the second source device to transmit a second plurality of probing packets to the second subset of the plurality of target IP addresses and receive a second plurality of returned packets, and based on the first plurality of returned packets and the second plurality of returned packets, generating a data structure representing a routing topology of the network.

An exemplary non-transitory computer-readable storage medium stores one or more programs, the one or more programs comprising instructions, which when executed by one or more processors of an electronic device, cause the electronic device to: obtain a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; assign a first subset of the plurality of target IP addresses to a first source device of a set of source devices by providing a first source-specific version of the first bit array to the first source device; assign a second subset of the plurality of target IP addresses to a second source device of the set of source devices by providing a second source-specific version of the first bit array to the second source device; cause the first source device to transmit a first plurality of probing packets to the first subset of the plurality of target IP addresses and receive a first plurality of returned packets, cause the second source device to transmit a second plurality of probing packets to the second subset of the plurality of target IP addresses and receive a second plurality of returned packets, and based on the first plurality of returned packets and the second plurality of returned packets, generate a data structure representing a routing topology of the network.

An exemplary computer-enabled method for obtaining a routing topology of a network comprises transmitting, from a source device, a first probing packet and a second probing packet to a target IP address, wherein the first probing packet is associated with a first time-to-live value and wherein the second probing packet is associated with a second time-to-live value, receiving, at the source device, a first returned packet corresponding to the first probing packet and a second returned packet corresponding to the second probing packet; constructing a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and based on the byte array, constructing a bit array, wherein the bit array comprises a plurality of binary values corresponding to a plurality of IP addresses in the network, and wherein each binary value is indicative of whether a corresponding IP addresses is a router.

In some embodiments, the source device is a first source device, the target IP address is a first target IP address, and the subarray is a first subarray, the method further comprising: transmitting, from a second source device, a third probing packet and a fourth probing packet to a second target IP address, receiving, at the second source device, a third returned packet corresponding to the third probing packet and a fourth returned packet corresponding to the fourth probing packet; wherein constructing the byte array is based on the third returned packet and the fourth returned packet, wherein the byte array comprises a second subarray, and wherein the second subarray comprises a field indicative of the second source device, a field indicative of an IP address associated with the third returned packet, and a field indicative of an IP address associated with the fourth returned packet.

In some embodiments, the method further comprises initializing the bit array as an array of a plurality of zeros.

In some embodiments, the method further comprises based on the IP address associated with the first returned packet as indicated in the byte array, updating a binary value corresponding to the IP address associated with the first returned packet in the bit array.

An exemplary electronic device comprises: one or more processors; a memory; and one or more programs, wherein the one or more programs are stored in the memory and configured to be executed by the one or more processors, the one or more programs including instructions for: transmitting, from a source device, a first probing packet and a second probing packet to a target IP address, wherein the first probing packet is associated with a first time-to-live value and wherein the second probing packet is associated with a second time-to-live value, receiving, at the source device, a first returned packet corresponding to the first probing packet and a second returned packet corresponding to the second probing packet; constructing a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and based on the byte array, constructing a bit array, wherein the bit array comprises a plurality of binary values corresponding to a plurality of IP addresses in the network, and wherein each binary value is indicative of whether a corresponding IP addresses is a router.

An exemplary non-transitory computer-readable storage medium stores one or more programs, the one or more programs comprising instructions, which when executed by one or more processors of an electronic device, cause the electronic device to: transmit, from a source device, a first probing packet and a second probing packet to a target IP address, wherein the first probing packet is associated with a first time-to-live value and wherein the second probing packet is associated with a second time-to-live value, receive, at the source device, a first returned packet corresponding to the first probing packet and a second returned packet corresponding to the second probing packet; construct a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and based on the byte array, construct a bit array, wherein the bit array comprises a plurality of binary values corresponding to a plurality of IP addresses in the network, and wherein each binary value is indicative of whether a corresponding IP addresses is a router.

BRIEF DESCRIPTION OF THE FIGURES

FIG. 2A depicts an exemplary data structure storing target IP addresses for a scan, in accordance with some embodiments.

FIG. 2C depicts an exemplary data structure indicating routers in a large-scale network such as the Internet, in accordance with some embodiments.

FIG. 6A depicts an exemplary method, in accordance with some embodiments.

FIG. 6B depicts an exemplary method, in accordance with some embodiments.

DETAILED DESCRIPTION OF THE DISCLOSURE

The following description sets forth exemplary methods, parameters, and the like. It should be recognized, however, that such description is not intended as a limitation on the scope of the present disclosure but is instead provided as a description of exemplary embodiments.

The present disclosure is directed to electronic devices, systems, methods, non-transitory storage media, and apparatus for implementing a globally distributed Internet scanning instrument that can be used to conduct a topological survey of a large-scale network to obtain the routing topology of the network. In some embodiments, the network can be the Internet covering the entire IPv4 address space.

Although the following description uses terms "first," "second," etc. to describe various elements, these elements should not be limited by the terms. These terms are only used to distinguish one element from another. For example, a first packet could be termed a second packet, and, similarly, a second packet could be termed a first packet, without departing from the scope of the various described embodiments. The first packet and the second packet are both packets, but they are not the same packet.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
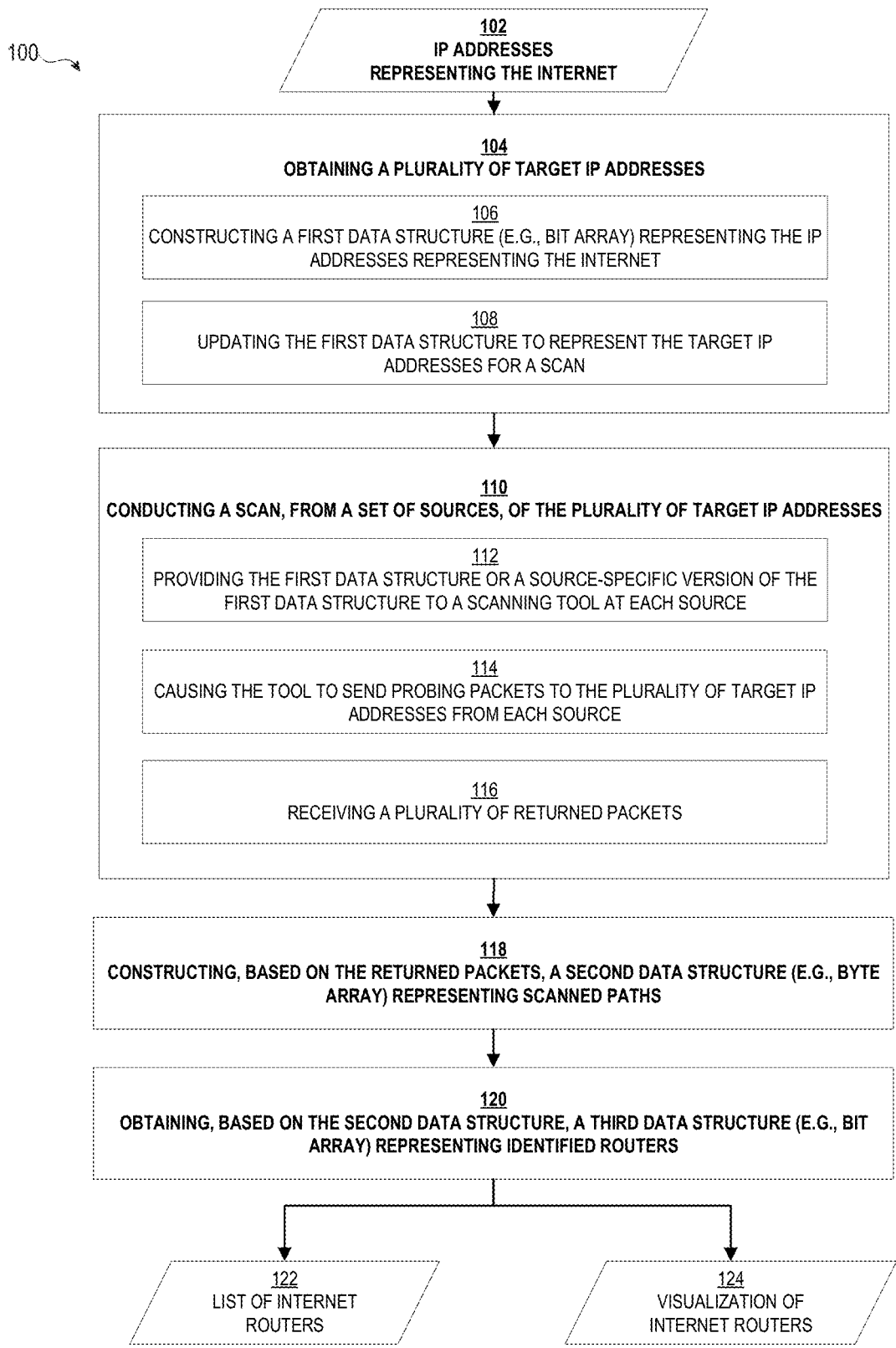
FIG. 1 depicts an exemplary process for discovering the topology of a large-scale network in an efficient manner, in accordance with some embodiments.

FIG. 1 illustrates an exemplary process 100 for collecting data capturing the routing topology of a network and processing the data for efficient storage and retrieval, in accordance with some embodiments. In some embodiments, the network is the Internet covering the entire IPv4 address space. Process 100 is performed, for example, using one or more electronic devices implementing a software platform. In some examples, process 100 is performed using a client-server system, and the blocks of process 100 are divided up in any manner between the server and a client device. In other examples, the blocks of process 100 are divided up between the server and multiple client devices. In other examples, process 100 is performed using only a client device or only multiple client devices. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

The Internet includes a collection of interconnected electronic devices (e.g., routers, end points), and each of the interconnected electronic devices can be associated with an IP address. With reference to FIG. 1, the collection of interconnected electronic devices forming the Internet at a given time can be represented by IP addresses 102. In some embodiments, the Internet comprises M number of interconnected electronic devices (e.g., M>4.3 billion) at a given time. Accordingly, IP addresses 102 can include M number of IP addresses (e.g., M>4.3 billion) at a given time. It should be appreciated that the value of M can change (e.g., increase or decrease) over time as the Internet evolves (e.g., expands or shrinks). Further, while an embodiment of the invention can discover the topology of the IPv4 space of the Internet in which the network nodes are identified as IP addresses, it should be appreciated that the techniques disclosed herein can be used to discover the topology of any network, in which the nodes can be represented via an IP address or any other type of identifiers (e.g., IPv6 address, other network address data).

At block 104, the system (e.g., one or more electronic devices) obtains a plurality of target IP addresses. Block 104 can include blocks 106 and 108, as described below.

In some embodiments, at block 106, the system constructs a first data structure representing the IP addresses 102. In some embodiments, the first data structure is a bit array. FIG. 2A illustrates an exemplary bit array 200 representing the IP addresses 102. As depicted, the bit array 200 includes M elements corresponding to the M number of IP addresses 102. Each element is a bit value (i.e., 0 or 1) representing whether the respective IP address is a target of a scan, as described below.

In some embodiments, at block 108, the system updates the first data structure to represent the target IP addresses for a scan. In some embodiments, a subset of IP addresses 102 are excluded from the scan and indicated as such in the first data structure. The subset can include IP addresses that are reserved, IP addresses that are not routable, or a combination thereof. With reference to FIG. 2A, the system uses the bit value corresponding each IP address to mark it as a target (e.g., 1) or a non-target (e.g., 0). For example, among the M number of IP addresses, N number of IP addresses are marked as targets (e.g., 1) in the bit array 200. In some embodiments, M is approximately 4.3 billion, and N is approximately 3.7 billion.

At block 110, the system conducts a scan, from a set of sources, of the plurality of target IP addresses. In some embodiments, the set of sources comprises electronic network-connected devices located at a plurality of geographically distributed (e.g., globally distributed) vantage points. In some embodiments, the physical locations of the sources may be both inside contiguous United States (CONUS) and outside contiguous United States (OCONUS). In some embodiments, the set of sources includes third-party devices, such as Amazon Web Services (AWS) devices.

In each scan, the set of sources scans the plurality of target IP addresses. As discussed below, each source can be configured to scan all or a subset of the plurality of target IP addresses. The sources can conduct the scan simultaneously and independently.

In some embodiments, at block 112, the system provides the first data structure or a source-specific version of the first data structure to a scanning tool at each source. At each source device, a scanning tool is available for scanning paths from the source device (i.e., source IP address) to target devices (i.e., target IP addresses). Detailed operations of the scanning tool are described herein with reference to block 112.

In some embodiments, the system causes each scanning tool (and thus each source) to scan all of the target IP addresses. Thus, the system provides the first data structure (e.g., instances of bit array 200), which indicates all of the target IP addresses, to the scanning tool at each source.

In some embodiments, the system causes each scanning tool (and thus each source) to scan only a subset of the target addresses. Thus, the system provides a source-specific version of the first data structure to the scanning tool at each source. For example, while the first data structure can be a bit array with a total of M elements and with N elements marked as targets, a source-specific version can be an bit array with a total of M elements and with L elements marked as targets, where L<N. Alternatively, the system can send the first data structure to a scanning tool, together with an offset and/or a range indicating the subset of target IP addresses in the bit array to be scanned by the source.

It can be advantageous for different sources at different geographic locations to scan different subsets of the target IP addresses. For example, scanning two neighboring IP addresses from the same source may cause substantially the same path to be traversed, thus yielding relatively little information about the topology of the network. On the other hand, scanning two neighboring IP addresses from two different sources (e.g., one in America and one in Australia) can cause two different paths to be traversed, thus exercising a larger portion of the Internet and yielding information about the Internet. In some embodiments, the entire set of target IP addresses can be split among the source devices for scanning. For example, if there are M number of target IP addresses to be scanned by P number of sources, the target IP addresses can be divided into P subsets of target IP addresses. The P subsets of target IP addresses can be assigned to the P number of sources.

In some embodiments, the assignment of the target IP addresses to the sources can be done in an "offset" fashion to ensure that the neighboring IP addresses are assigned to different sources. Specifically, since numerically similar IP address locations can be expected to be generally geographically similar/close to one another, using an offset to assign the IP addresses to the sources achieves advantageous variation of paths by ensuring that geographically variant sources are scanning geographically variant locations. The offset can be done by listing all of the target addresses in numerical order, and then assigning each address to one of the sources in a cyclical fashion. For example, if 100 target addresses (addresses 1-100) are assigned to 10 sources (sources 1-10), source 1 will get addresses 1, 11, 21 . . . and 91; source 2 will get addresses 2, 12, 22 . . . and 92; and so on. This may be advantageous over, for example, assigning addresses 1-10 all to source 1, addresses 11-20 all to source 2, and so on, as that methodology may lead to redundant data based on similar routing paths returned from geographically similar IP addresses all scanned by the same source.

In some embodiments, at block 112, the system causes the tool to send probing packets to the plurality of target IP addresses from each source. Further, at block 116, the system receives a plurality of returned packets.

Specifically, at each source device, a scanning tool is available for scanning paths from the source device (i.e., source IP address) to target devices (i.e., target IP addresses). The scanning tool can be a software program configured to send probing packets from the source device to the target devices, receive returned packets, and identify paths traversed based on the returned packets.

In some embodiment, the scanning tool is the YARRP (Yelling at Random Routers Progressively) tool developed by the Naval Postgraduate School. The YARRP tool is a known tool providing randomized high-speed topology discovery. Detailed description of the YARRP tool is provided in "Yarrp'ing the Internet: Randomized High-Speed Active Topology Discovery" by Robert Beverly, available at https://rbeverly.net/research/papers/yarp-ime16.pdf and is incorporated by reference herein.

Figure 3:
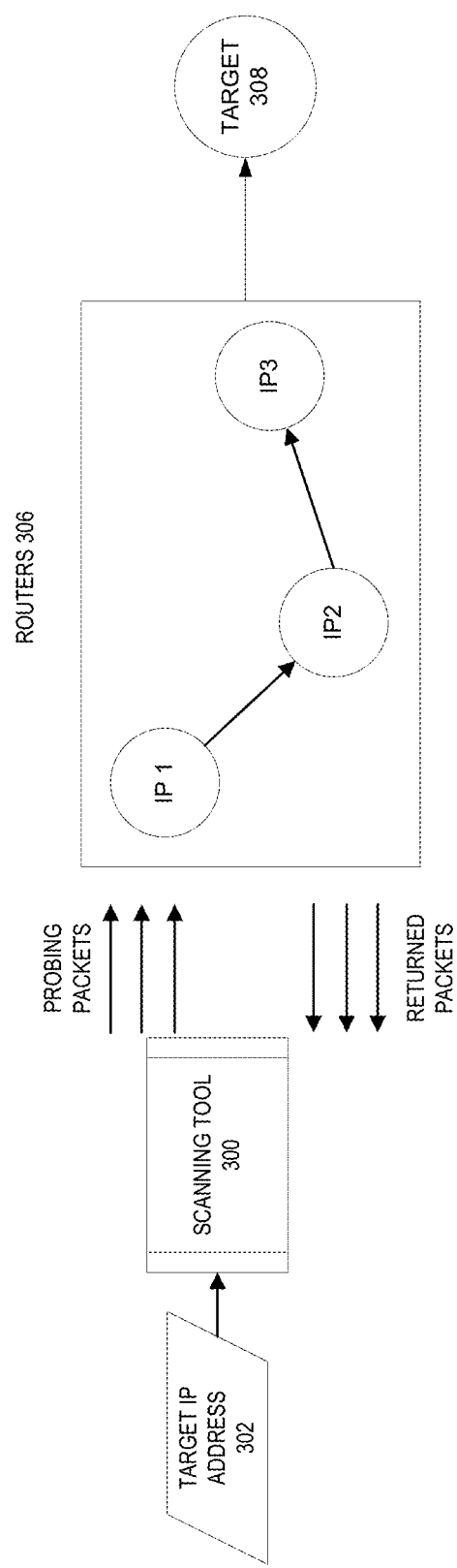
FIG. 3 depicts exemplary operations of a scanning tool, in accordance with some embodiments.

FIG. 3 depicts operations of an exemplary scanning tool 300, in accordance with some embodiments. The scanning tool 300 receives target address 302 to be scanned. The target address 302 may be indicated as a target in a bit array, as described above. As depicted, the scanning tool sends a plurality of probing packets to the target address 302 and receives returned packets.

In scanning tools such as traceroute and YARRP, the probing packets are Internet Control Message Protocol ("ICMP") packets with successive time-to-live ("TTL"). For example, the probing packets includes a first packet with TTL=1, a second packet with TTL=2, a third packet with TTL=3, and so forth. The probing packets traverse some or all of the routers 306. For each probing packet, when the number of hops made exceeds its TTL, a returned packet is generated and transmitted from the final router to the source device. For example, the first packet with TTL=1 may perform a hop to a router IP1 from the source device, and router IP1 transmits a first returned packet to the source device. Similarly, the second packet with TTL=2 may perform a first hop to a router IP1 from the source device and second hop to a router IP2, and router IP2 transmits a second returned packet to the source device. Similarly, the third packet with TTL=3 may perform a first hop to a router IP1 from the source device, a second hop to IP 2, and a third hop to IP3, and router IP3 transmits a third returned packet to the source device.

In YARRP, the probing order is randomized. In other words, the first, second, and third packets in the example above may be sent by the source device in any random order or simultaneously, and often at a high rate (e.g., 100,000 packets per second). As such, the returned packets may arrive out of order. Further, the tool is stateless, whereby all necessary state information is encoded into the probes such that it can be received from the ICMP relies (i.e., the returned packets).

In some embodiments, at each source device, the system causes the YARRP tool to send probing packets to each of the target IP addresses assigned to the source. In one example, the YARRP tool is configured to send a plurality of packets with successive TTL values up to a predefined maximum value (e.g., 1, 2, 3, . . . , 31, 32) from the source device to each target IP address. The TTL maximum value is set to ensure that some of the probing packets are allowed enough hops to traverse a complete path from the source device to the target IP address. The TTL maximum value can be adjusted based on the size of the network. In some embodiments, the packet rate can be adjusted to ensure high-quality data collection. For example, packet rate can be adjusted in multiple scans to determine a correlation between packet rate and the number of returned packets.

At block 118, the system constructs, based on the returned packets, a second data structure representing scanned paths. In some embodiments, the returned packets are aggregated into one or more files (e.g., a text file). In some embodiments, the returned packets are first processed to remove fields that are not of interest. In some embodiments, the fields that are not of interest include usec (e.g., microseconds, timestamp information, etc.), type (e.g., ICMP type), code (ICMP type sub-code), identifier of an IP packet (e.g., "IPID"), packet size information (e.g., "psize", "rsize"), remaining time to live ("RTTL") information, retransmission timeout ("RTO") information, count (e.g., total count of all packets received), and sec (e.g., unix time, timestamp information, etc.). This can reduce the amount of data for further processing. In a particular scan, 35 terabytes of returned packets can be reduced to 14 terabytes by removing the fields that are not of interest.

Figure 2B:
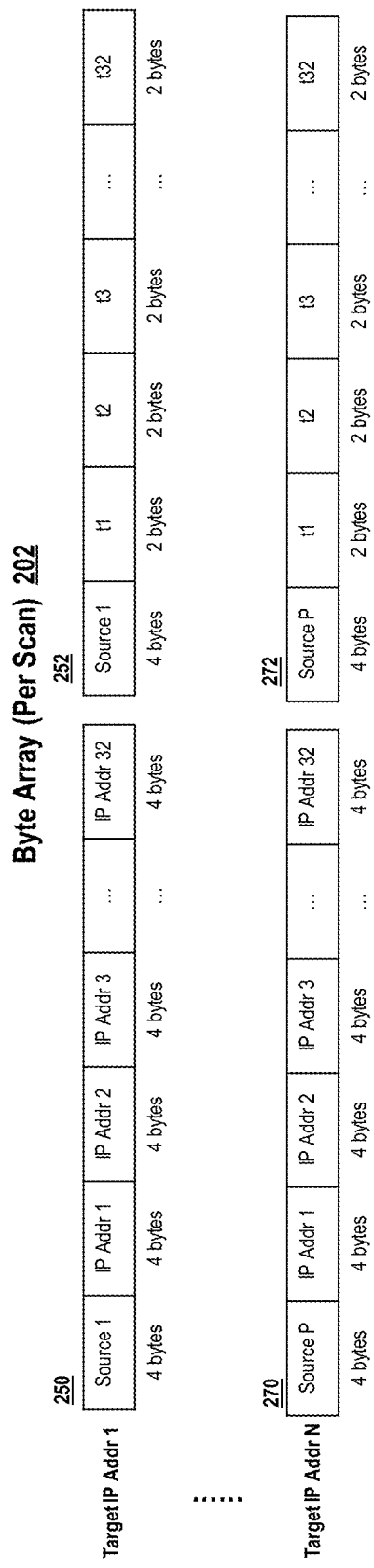
FIG. 2B depicts an exemplary data structure storing traversed paths of a scan and associated information, in accordance with some embodiments.

The second data structure is then constructed to store information of interest from the returned packet for efficient storage and retrieval. In some embodiments, the second data structure is a byte array stored in a binary file format. FIG. 2B illustrates an exemplary byte array 202 that encodes information of interest from the returned packet. For each target IP address, the exemplary byte array comprises a set of subarrays. For example, for Target IP Address 1, the exemplary byte array comprises a set of subarrays 250 and 252. Similarly, for Target IP Address 2, the exemplary byte array comprises a set of subarrays 270 and 272.

The subarray 250 indicates routers traversed by probing packets from Source 1 to Target IP Address 1. Specifically, the subarray includes a 4-byte element for storing the IP address of Source 1, as well as 32 4-byte elements for storing the routers. For example, if the system receives a returned packet corresponding to a probing packet sent from Source 1 to Target IP address 1 with TTL=1, the system can extract from the returned packet the IP address of the first router (i.e., the router that has sent the returned packet) and store the IP address of the first router as IP Address 1 in the subarray 250. Further, if the system receives a returned packet corresponding to a probing packet sent from Source 1 to Target IP address 1 with TTL=2, the system can extract from the returned packet the IP address of the second router (i.e., the router that has sent the returned packet) and store the IP address of the second router as IP Address 2 in the subarray 250. In some embodiments, storage space for the 32 elements is always allocated regardless of how returned packets are received. It should be appreciated that not all 32 elements may be filled; for example, if there are only 3 routers in the path between Source 1 and Target IP Address 1, only three 4-byte elements will be filled in the subarray 250. Each of the remaining elements can be filled with a 4-byte integer 0, representing a null case.

The subarray 252 indicates another type of information of interest related to the path between Source 1 to Target IP Address 1. Specifically, the subarray includes a 4-byte element for storing the IP address of Source 1, as well as 32 2-byte elements for storing the roundtrip time between Source 1 and the respective router. For example, if the system receives a returned packet corresponding to a probing packet sent from Source 1 to Target IP address 1 with TTL=1, the system can extract from the returned packet the roundtrip time between Source 1 and the first router (i.e., the router that has sent the returned packet) and store the roundtrip time of the first router as t1 in the subarray 252. In some embodiments, an average time is calculated based on multiple returned packets. In some embodiments, the subarray 252 does not include the 4-byte element for storing the IP address of Source 1, as the address can be identified in the subarray 250.

It should be appreciated that additional subarrays can be included in the byte array to store other types of information of interest related to the path between Source 1 to Target IP Address 1. For example, returned packets may include fields indicative the device type of the router, geographical information of the router (e.g., host name indicating the state and city of the physical location), capabilities (e.g., bandwidth), configuration (e.g., port configuration), or any combination thereof. These information can be extracted and stored in the binary file. In some embodiments, once an IP address is identified to be associated with a router, additional analysis can be performed to derive additional information about the router based on some of these information. For example, to get domains names, an additional lookup can be run once the scan to identify routers has been completed. This lookup would take IP addresses identified as routers and try to determine more about them from their domain names.

In the depicted example, the byte array 202 includes a plurality of subarrays sorted by target IP addresses. As discussed above, for each of the target IP addresses in the Internet, at least one source device of a set of source devices is assigned to scan a given target IP address by sending successive probing packets. In the depicted example, at least Source 1 is assigned to scan Target IP Address 1, and at least Source P is assigned to scan Target IP Address N. Thus, for Target IP Address 1, the byte array 202 includes a subarray 250 indicating the routers between Target IP Address 1 and Source 1 (i.e., the source device assigned to scan Target IP Address 1) and a subarray 252 indicating the corresponding roundtrip times. For Target IP Address N, the byte array 202 includes a subarray 270 indicating the routers between Target IP Address N and Source P (i.e., the source device assigned to scan Target IP Address N) and a subarray 272 indicating the corresponding roundtrip times.

The byte array data structure allows for efficient storage, without compression, of the traversed paths from a scan of all target IP addresses by the set of source devices. In the above-mentioned exemplary scan in which the returned packets yield 14 terabytes of information of interest, the byte array can further reduce the storage to around 800 gigabytes.

Further, the byte array data structure allows efficient retrieval. To retrieve the traversed path to a given target from the byte array, an address can be easily calculated based on the given target IP address, and the retrieval can be done in constant time regardless of the target (i.e., same amount of time to retrieve any given target). In contrast, if the packets are stored in a single database, a linear search may be required and the lookup time is significantly longer.

At block 120, the system obtains (e.g., generates), based on the second data structure, a third data structure representing identified routers. In some embodiments, the third data structure is a bit array. FIG. 2C illustrates an exemplary bit array 204, with M number of elements representing M number of IP addresses. The M number of IP addresses can be all of the IP addresses in the Internet (e.g., over 4.3 billion) at a given time. In some embodiments, the bit array is initialized to be of a predefined size (e.g., 512 megabytes). Further, each element stores a bit value indicative of whether the respective IP address corresponds to a router (e.g., 1 for router and 0 for unknown). Initially, all of the elements in the bit array 204 are marked as 0.

Figure 4:
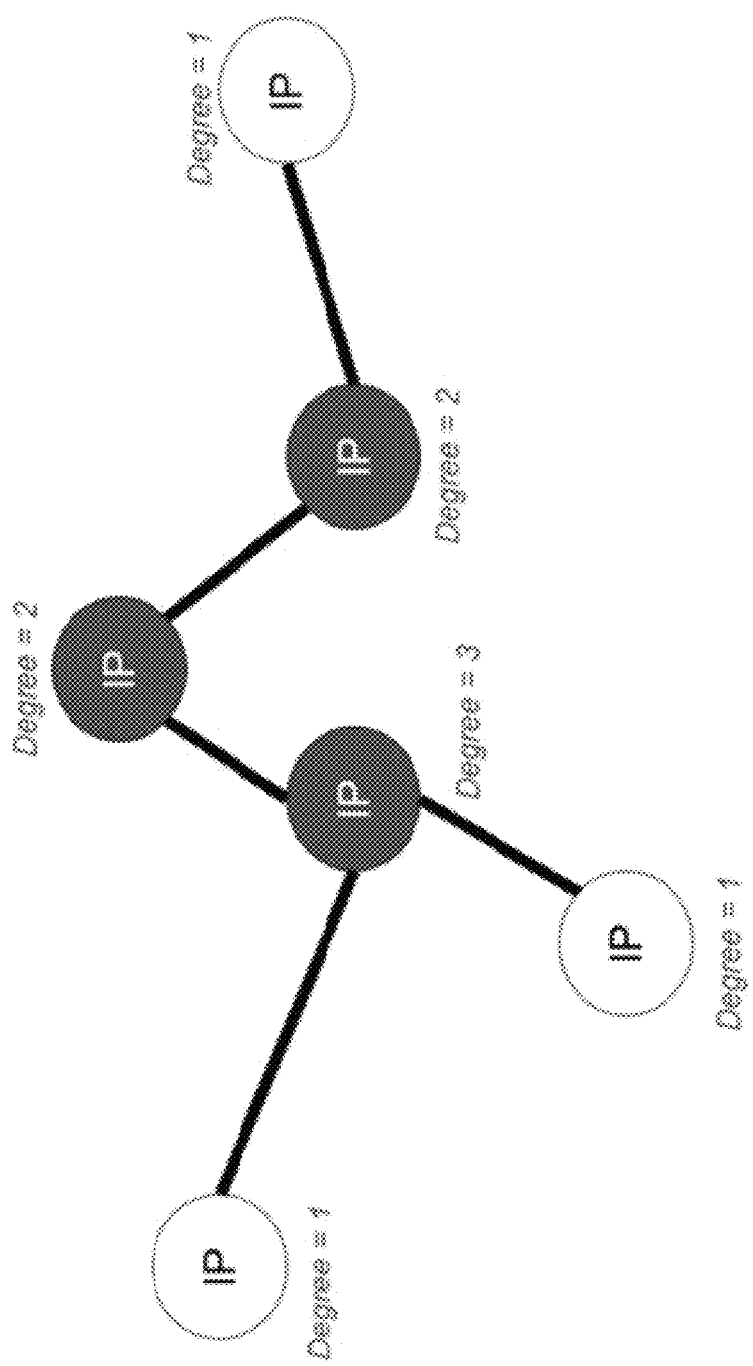
FIG. 4 depicts an exemplary partial topology of a network, in accordance with some embodiments.

Whether a node in a network is a router can be determined based on the edge degree of the node. Each node in a network has an edge degree. With reference to FIG. 4, for a node that is at the end of a path, the edge degree is 1 because there is one other node connected to it. For all other nodes, the edge degree is two or more. Thus, any node with an edge degrees of two or more is a router.

The system can easily identify an IP address as a router based on the second data structure (e.g., byte array 202). For example, all IP addresses following the 4-byte source field in subarray 250 are associated with routers, because each one of them has an edge degree of at least 2. Similarly, all IP addresses following the 4-type source field in subarray 270 are associated with routers.

Accordingly, the system can traverse the byte array 202 to extract the IP addresses in the subarrays, and update the bit array 204 by flipping the elements corresponding to those IP addresses from 0's to 1's. After traversing the entire byte array 202, the bit array 204 is updated to indicate all of the routers identified from the scan. It should be appreciated that a target address may appear in one of the subarrays (e.g., Target IP Address 1 may appear in the subarray 270) and thus be identified as a router.

The above-described processing of the byte array to identify routers is an efficient way of discovering routers without having to generate a complete graph of the routable Internet. Further, the resulting bit array 204 allows for efficient storage and retrieval. The lookup time for any given IP address in the bit array is essentially instantaneous.

The above-described blocks 110-120 correspond to one scan, in which a set of source devices are assigned to scan the entire set of target IP addresses (e.g., all allocated IPv4 IP addresses). Multiple scans can be conducted, each scan producing a new bit array. In some embodiments, the bit arrays can be compared to determine how the Internet evolves, and the rate of scans can be adjusted accordingly.

With reference to FIG. 1, the scan conducted can be used to produce valuable and actionable data, such as a list of known Internet routers 122, visualization of known Internet routers and connections 124, and Internet routers of interest 126.

In some embodiments, the list of known Internet routers 122 can be used to uncover abnormal traffic. For example, a network traffic log may include a plurality of IP addresses. Previously, it is difficult to determine whether any of the IP addresses corresponds to a router. Using the list of known Internet routers 122 (which could be the bit array 204), routers can be easily discovered in a log file and further investigation can be conducted to determine whether the router is malicious. In some embodiments, a web interface can be provided for a user to upload a log file and receive identified routers in the log file, along with other analysis (e.g., location of the router, known facts about the router).

Figure 5:
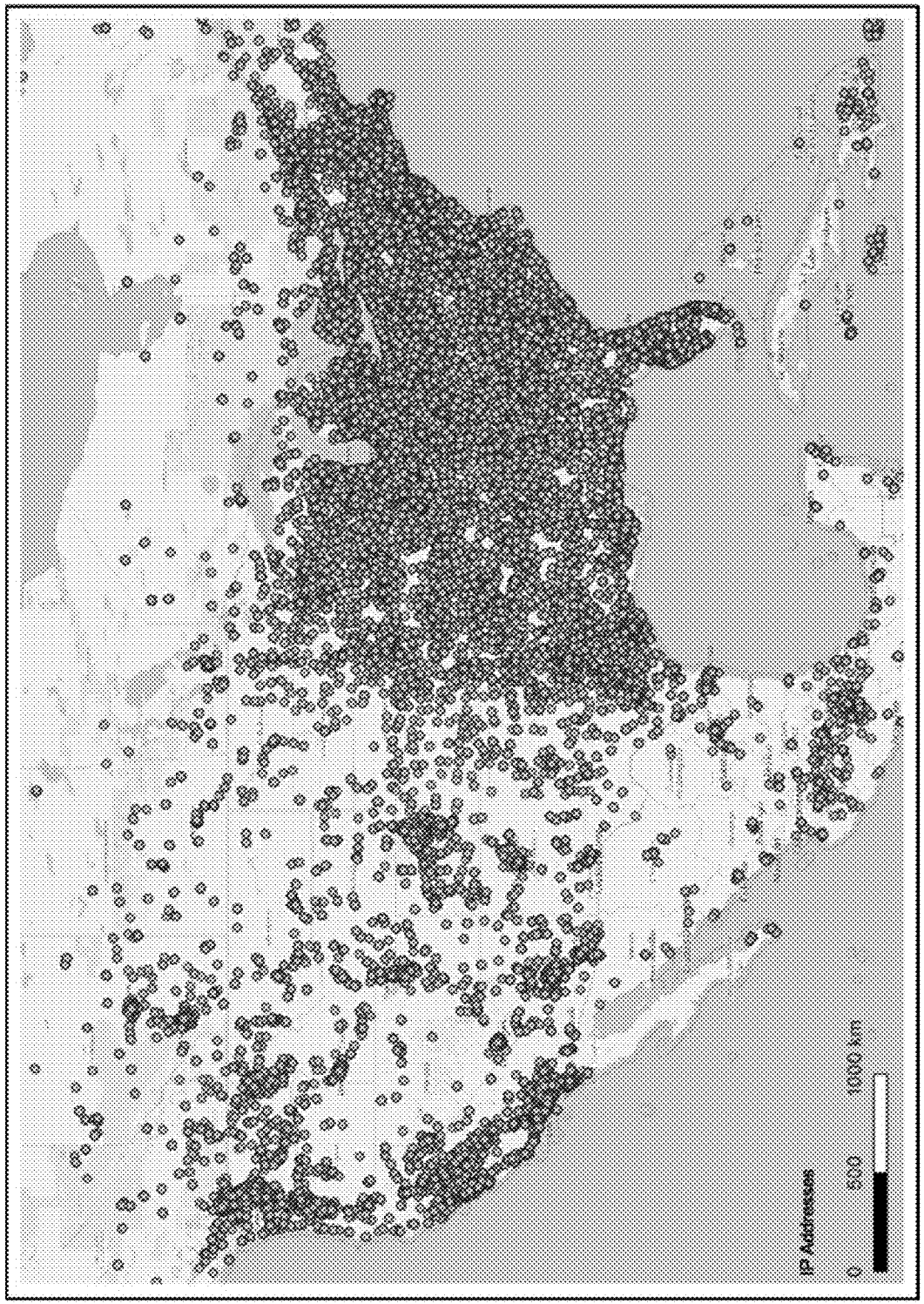
FIG. 5 depicts an exemplary visualization of routers, in accordance with some embodiments.

In some embodiments, the visualization of Internet routers include a graph of the identified routers and the interconnectivity among the routers. The graph can be generated, for example, based on the byte array. In some embodiments, the graph can be overlaid over a geographic map. FIG. 5 depicts an exemplary visualization of identified routers. The map can be used to identify landmarks (e.g., previously unknown area of cyber threat landscape) and gather intelligence regarding critical physical locations. In some embodiments, the map interface includes graphical representations of key infrastructure nodes, such as Internet Exchange Points. In some embodiments, a scan can be conducted periodically (e.g., every 2-4 weeks) to update the map interface.

FIG. 6A illustrates process 600 for obtaining a routing topology of a network, according to various examples. Process 600 is performed, for example, using one or more electronic devices implementing a software platform. In some examples, process 600 is performed using a client-server system, and the blocks of process 600 are divided up in any manner between the server and a client device. In other examples, the blocks of process 600 are divided up between the server and multiple client devices. Thus, while portions of process 600 are described herein as being performed by particular devices of a client-server system, it will be appreciated that process 600 is not so limited. In other examples, process 600 is performed using only a client device or only multiple client devices. In process 600, some blocks are, optionally, combined, the order of some blocks is, optionally, changed, and some blocks are, optionally, omitted. In some examples, additional steps may be performed in combination with the process 600. Accordingly, the operations as illustrated (and described in greater detail below) are exemplary by nature and, as such, should not be viewed as limiting.

An exemplary computer-enabled method for obtaining a routing topology of a network, the method comprises: at block 602, obtaining a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; at block 604, assigning a first subset of the plurality of target IP addresses to a first source device of a set of source devices by providing a first source-specific version of the first bit array to the first source device; at block 606, assigning a second subset of the plurality of target IP addresses to a second source device of the set of source devices by providing a second source-specific version of the first bit array to the second source device; at block 608, causing the first source device to transmit a first plurality of probing packets to the first subset of the plurality of target IP addresses and receive a first plurality of returned packets; at block 610, causing the second source device to transmit a second plurality of probing packets to the second subset of the plurality of target IP addresses and receive a second plurality of returned packets, and at block 612, based on the first plurality of returned packets and the second plurality of returned packets, generating a data structure representing a routing topology of the network.

In some embodiments, obtaining the first bit array indicative of the plurality of target IP addresses comprises: determining whether an IP address of the plurality of IP addresses is a reserved address; and updating a binary value corresponding to the IP address in the first bit array based on the determination.

In some embodiments, the first source-specific version of the first bit array comprises an instance of the first bit array and a value indicative of a portion of the first bit array.

In some embodiments, the first source-specific version of the first bit array comprises a modified instance of the first bit array, wherein a subset of the plurality of target IP addresses are indicated in the modified instance of the first bit array.

In some embodiments, the first source device comprises a scanning tool.

In some embodiments, the scanning tool is configured to transmit a first probing packet and a second probing packet of the plurality of probing packets to a target IP address of the first subset of the plurality of target IP addresses in a random order.

In some embodiments, the first probing packet and the second probing packet are associated with successive time-to-live values.

In some embodiments, the first probing packet and the second probing packet are ICMP packets.

In some embodiments, generating the data structure representing the routing topology comprises generating, based on the first plurality of returned packets and the second plurality of returned packets, a byte array representing one or more routing paths of the first plurality of first plurality of returned packets and the second plurality of returned packets.

In some embodiments, generating the data structure representing the routing topology comprises generating a second bit array based on the byte array, wherein the second bit array comprises a plurality of binary values corresponding to respective network nodes of one or more routing paths.

In some embodiments, the method further comprises displaying a visualization of the routing topology over a map interface.

In some embodiments, the method further comprises displaying a plurality of routers identified based on the routing topology.

An exemplary electronic device, comprises: one or more processors; a memory; and one or more programs, wherein the one or more programs are stored in the memory and configured to be executed by the one or more processors, the one or more programs including instructions for: obtaining a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; assigning a first subset of the plurality of target IP addresses to a first source device of a set of source devices by providing a first source-specific version of the first bit array to the first source device; assigning a second subset of the plurality of target IP addresses to a second source device of the set of source devices by providing a second source-specific version of the first bit array to the second source device; causing the first source device to transmit a first plurality of probing packets to the first subset of the plurality of target IP addresses and receive a first plurality of returned packets, causing the second source device to transmit a second plurality of probing packets to the second subset of the plurality of target IP addresses and receive a second plurality of returned packets, and based on the first plurality of returned packets and the second plurality of returned packets, generating a data structure representing a routing topology of the network.

An exemplary non-transitory computer-readable storage medium stores one or more programs, the one or more programs comprising instructions, which when executed by one or more processors of an electronic device, cause the electronic device to: obtain a first bit array indicative of a plurality of target IP addresses, wherein the plurality of target IP addresses is a subset of a plurality of IP addresses in the network, wherein the first bit array comprises a plurality of binary values corresponding to the plurality of IP addresses in the network, and wherein each binary value is indicative of whether a corresponding IP addresses is a target IP address; assign a first subset of the plurality of target IP addresses to a first source device of a set of source devices by providing a first source-specific version of the first bit array to the first source device; assign a second subset of the plurality of target IP addresses to a second source device of the set of source devices by providing a second source-specific version of the first bit array to the second source device; cause the first source device to transmit a first plurality of probing packets to the first subset of the plurality of target IP addresses and receive a first plurality of returned packets, cause the second source device to transmit a second plurality of probing packets to the second subset of the plurality of target IP addresses and receive a second plurality of returned packets, and based on the first plurality of returned packets and the second plurality of returned packets, generate a data structure representing a routing topology of the network.

FIG. 6B illustrates process 650 for obtaining a routing topology of a network, according to various examples. Process 650 is performed, for example, using one or more electronic devices implementing a software platform. In some examples, process 650 is performed using a client-server system, and the blocks of process 650 are divided up in any manner between the server and a client device. In other examples, the blocks of process 650 are divided up between the server and multiple client devices. Thus, while portions of process 650 are described herein as being performed by particular devices of a client-server system, it will be appreciated that process 650 is not so limited. In other examples, process 650 is performed using only a client device or only multiple client devices. In process 650, some blocks are, optionally, combined, the order of some blocks is, optionally, changed, and some blocks are, optionally, omitted. In some examples, additional steps may be performed in combination with the process 650. Accordingly, the operations as illustrated (and described in greater detail below) are exemplary by nature and, as such, should not be viewed as limiting.

An exemplary computer-enabled method for obtaining a routing topology of a network comprises at block 652, transmitting, from a source device, a first probing packet and a second probing packet to a target IP address, wherein the first probing packet is associated with a first time-to-live value and wherein the second probing packet is associated with a second time-to-live value; at block 654, receiving, at the source device, a first returned packet corresponding to the first probing packet and a second returned packet corresponding to the second probing packet; at block 656, constructing a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and at block 658, based on the byte array, constructing a bit array, wherein the bit array comprises a plurality of binary values corresponding to a plurality of IP addresses in the network, and wherein each binary value is indicative of whether a corresponding IP addresses is a router.

In some embodiments, the source device is a first source device, the target IP address is a first target IP address, and the subarray is a first subarray, the method further comprising: transmitting, from a second source device, a third probing packet and a fourth probing packet to a second target IP address, receiving, at the second source device, a third returned packet corresponding to the third probing packet and a fourth returned packet corresponding to the fourth probing packet; wherein constructing the byte array is based on the third returned packet and the fourth returned packet, wherein the byte array comprises a second subarray, and wherein the second subarray comprises a field indicative of the second source device, a field indicative of an IP address associated with the third returned packet, and a field indicative of an IP address associated with the fourth returned packet.

In some embodiments, the method further comprises initializing the bit array as an array of a plurality of zeros.

In some embodiments, the method further comprises based on the IP address associated with the first returned packet as indicated in the byte array, updating a binary value corresponding to the IP address associated with the first returned packet in the bit array.

An exemplary electronic device comprises: one or more processors; a memory; and one or more programs, wherein the one or more programs are stored in the memory and configured to be executed by the one or more processors, the one or more programs including instructions for: transmitting, from a source device, a first probing packet and a second probing packet to a target IP address, wherein the first probing packet is associated with a first time-to-live value and wherein the second probing packet is associated with a second time-to-live value, receiving, at the source device, a first returned packet corresponding to the first probing packet and a second returned packet corresponding to the second probing packet; constructing a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and based on the byte array, constructing a bit array, wherein the bit array comprises a plurality of binary values corresponding to a plurality of IP addresses in the network, and wherein each binary value is indicative of whether a corresponding IP addresses is a router.

An exemplary non-transitory computer-readable storage medium stores one or more programs, the one or more programs comprising instructions, which when executed by one or more processors of an electronic device, cause the electronic device to: transmit, from a source device, a first probing packet and a second probing packet to a target IP address, wherein the first probing packet is associated with a first time-to-live value and wherein the second probing packet is associated with a second time-to-live value, receive, at the source device, a first returned packet corresponding to the first probing packet and a second returned packet corresponding to the second probing packet; construct a byte array based on the first returned packet and the second returned packet, wherein the byte array comprises a subarray, and wherein the subarray comprises a field indicative of the source device, a field indicative of an IP address associated with the first returned packet, and a field indicative of an IP address associated with the second returned packet; and based on the byte array, construct a bit array, wherein the bit array comprises a plurality of binary values corresponding to a plurality of IP addresses in the network, and wherein each binary value is indicative of whether a corresponding IP addresses is a router.

Figure 7:
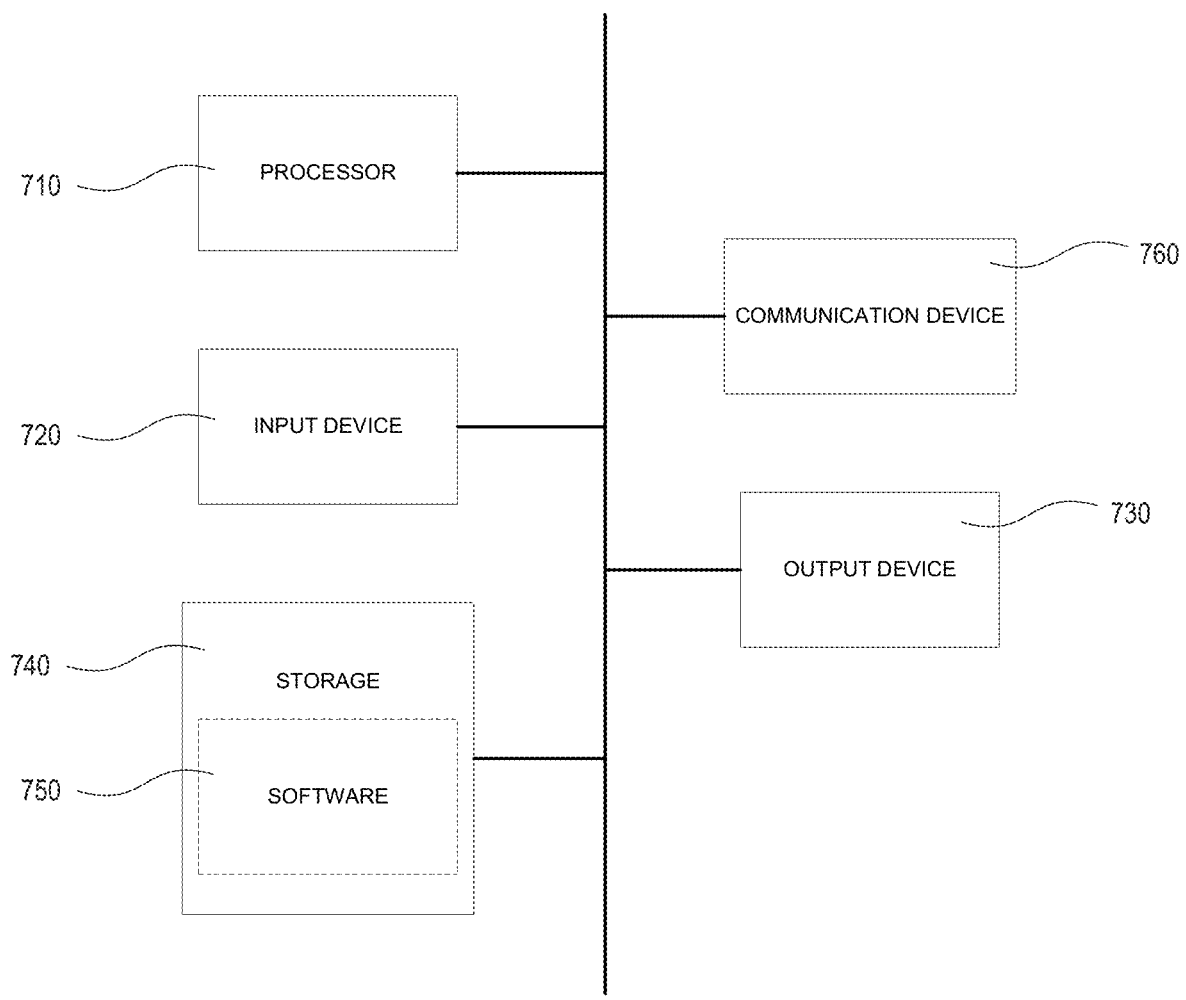
FIG. 7 depicts an exemplary electronic device, in accordance with some embodiments.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, workstation, server or handheld computing device (portable electronic device) such as a phone or tablet. The device can include, for example, one or more of processor 710, input device 720, output device 730, storage 740, and communication device 760. Input device 720 and output device 730 can generally correspond to those described above, and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 700 may be connected to a network, which can be any suitable type of interconnected communication system.

The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A computer-enabled method for obtaining a routing topology of a network, the method comprising:
   obtaining a first bit array indicative of a plurality of target IP addresses,
      wherein the plurality of target IP addresses is a subset of a plurality of IP addresses in the network,
      wherein the first bit array comprises a plurality of binary values corresponding to the plurality of IP addresses in the network, and
      wherein each binary value is indicative of whether a corresponding IP addresses is a target IP address;
   assigning a first subset of the plurality of target IP addresses to a first source device of a set of source devices by providing a first source-specific version of the first bit array to the first source device;
   assigning a second subset of the plurality of target IP addresses to a second source device of the set of source devices by providing a second source-specific version of the first bit array to the second source device;
   causing the first source device to transmit a first plurality of probing packets to the first subset of the plurality of target IP addresses and receive a first plurality of returned packets,
   causing the second source device to transmit a second plurality of probing packets to the second subset of the plurality of target IP addresses and receive a second plurality of returned packets, and
   based on the first plurality of returned packets and the second plurality of returned packets, generating a data structure representing a routing topology of the network.

2. The method of claim 1, wherein obtaining the first bit array indicative of the plurality of target IP addresses comprises: determining whether an IP address of the plurality of IP addresses is a reserved address; and updating a binary value corresponding to the IP address in the first bit array based on the determination.

3. The method of claim 1, wherein the first source-specific version of the first bit array comprises an instance of the first bit array and a value indicative of a portion of the first bit array.

4. The method of claim 1, wherein the first source-specific version of the first bit array comprises a modified instance of the first bit array, wherein a subset of the plurality of target IP addresses are indicated in the modified instance of the first bit array.

5. The method of claim 1, wherein the first source device comprises a scanning tool.

6. The method of claim 5, wherein the scanning tool is configured to transmit a first probing packet and a second probing packet of the plurality of probing packets to a target IP address of the first subset of the plurality of target IP addresses in a random order.

7. The method of claim 6, wherein the first probing packet and the second probing packet are associated with successive time-to-live values.

8. The method of claim 7, wherein the first probing packet and the second probing packet are ICMP packets.

9. The method of claim 1, wherein generating the data structure representing the routing topology comprises generating, based on the first plurality of returned packets and the second plurality of returned packets, a byte array representing one or more routing paths of the first plurality of first plurality of returned packets and the second plurality of returned packets.

10. The method of claim 9, wherein generating the data structure representing the routing topology comprises generating a second bit array based on the byte array, wherein the second bit array comprises a plurality of binary values corresponding to respective network nodes of one or more routing paths.

11. The method of claim 1, further comprising: displaying a visualization of the routing topology over a map interface.

12. The method of claim 1, further comprising: displaying a plurality of routers identified based on the routing topology.

13. An electronic device, comprising:
   one or more processors;
   a memory; and
   one or more programs, wherein the one or more programs are stored in the memory and configured to be executed by the one or more processors, the one or more programs including instructions for:
   obtaining a first bit array indicative of a plurality of target IP addresses,
      wherein the plurality of target IP addresses is a subset of a plurality of IP addresses in the network,
      wherein the first bit array comprises a plurality of binary values corresponding to the plurality of IP addresses in the network, and
      wherein each binary value is indicative of whether a corresponding IP addresses is a target IP address;
   assigning a first subset of the plurality of target IP addresses to a first source device of a set of source devices by providing a first source-specific version of the first bit array to the first source device;
   assigning a second subset of the plurality of target IP addresses to a second source device of the set of source devices by providing a second source-specific version of the first bit array to the second source device;

causing the first source device to transmit a first plurality of probing packets to the first subset of the plurality of target IP addresses and receive a first plurality of returned packets, causing the second source device to transmit a second plurality of probing packets to the second subset of the plurality of target IP addresses and receive a second plurality of returned packets, and based on the first plurality of returned packets and the second plurality of returned packets, generating a data structure representing a routing topology of the network.

14. A non-transitory computer-readable storage medium storing one or more programs, the one or more programs comprising instructions, which when executed by one or more processors of an electronic device, cause the electronic device to:

obtain a first bit array indicative of a plurality of target IP addresses,
wherein the plurality of target IP addresses is a subset of a plurality of IP addresses in the network,
wherein the first bit array comprises a plurality of binary values corresponding to the plurality of IP addresses in the network, and
wherein each binary value is indicative of whether a corresponding IP addresses is a target IP address;

assign a first subset of the plurality of target IP addresses to a first source device of a set of source devices by providing a first source-specific version of the first bit array to the first source device;

assign a second subset of the plurality of target IP addresses to a second source device of the set of source devices by providing a second source-specific version of the first bit array to the second source device;

cause the first source device to transmit a first plurality of probing packets to the first subset of the plurality of target IP addresses and receive a first plurality of returned packets, cause the second source device to transmit a second plurality of probing packets to the second subset of the plurality of target IP addresses and receive a second plurality of returned packets, and based on the first plurality of returned packets and the second plurality of returned packets, generate a data structure representing a routing topology of the network.

15. A computer-enabled method for obtaining a routing topology of a network, the method comprising:

transmitting, from a source device, a first probing packet and a second probing packet to a target IP address, wherein the first probing packet is associated with a first time-to-live value and wherein the second probing packet is associated with a second time-to-live value, receiving, at the source device, a first returned packet corresponding to the first probing packet and a second returned packet corresponding to the second probing packet;

constructing a byte array based on the first returned packet and the second returned packet,
wherein the byte array comprises a subarray, and
wherein the subarray comprises a field indicative of the source device, a field indicative of an IP address associated with the first returned packet, and a field indicative of an IP address associated with the second returned packet; and based on the byte array, constructing a bit array,
wherein the bit array comprises a plurality of binary values corresponding to a plurality of IP addresses in the network, and
wherein each binary value is indicative of whether a corresponding IP addresses is a router.

16. The method of claim 14, wherein the source device is a first source device, the target IP address is a first target IP address, and the subarray is a first subarray, the method further comprising:

transmitting, from a second source device, a third probing packet and a fourth probing packet to a second target IP address, receiving, at the second source device, a third returned packet corresponding to the third probing packet and a fourth returned packet corresponding to the fourth probing packet;

wherein constructing the byte array is based on the third returned packet and the fourth returned packet, wherein the byte array comprises a second subarray, and wherein the second subarray comprises a field indicative of the second source device, a field indicative of an IP address associated with the third returned packet, and a field indicative of an IP address associated with the fourth returned packet.

17. The method of claim 14, further comprising: initializing the bit array as an array of a plurality of zeros.

18. The method of claim 16, further comprising: based on the IP address associated with the first returned packet as indicated in the byte array, updating a binary value corresponding to the IP address associated with the first returned packet in the bit array.

19. An electronic device, comprising:
one or more processors;
a memory; and
one or more programs, wherein the one or more programs are stored in the memory and configured to be executed by the one or more processors, the one or more programs including instructions for:

transmitting, from a source device, a first probing packet and a second probing packet to a target IP address, wherein the first probing packet is associated with a first time-to-live value and wherein the second probing packet is associated with a second time-to-live value, receiving, at the source device, a first returned packet corresponding to the first probing packet and a second returned packet corresponding to the second probing packet;

constructing a byte array based on the first returned packet and the second returned packet,
wherein the byte array comprises a subarray, and
wherein the subarray comprises a field indicative of the source device, a field indicative of an IP address associated with the first returned packet, and a field indicative of an IP address associated with the second returned packet; and based on the byte array, constructing a bit array,
wherein the bit array comprises a plurality of binary values corresponding to a plurality of IP addresses in the network, and
wherein each binary value is indicative of whether a corresponding IP addresses is a router.

20. A non-transitory computer-readable storage medium storing one or more programs, the one or more programs comprising instructions, which when executed by one or more processors of an electronic device, cause the electronic device to:

transmit, from a source device, a first probing packet and a second probing packet to a target IP address, wherein the first probing packet is associated with a first time-to-live value and wherein the second probing packet is associated with a second time-to-live value, receive, at the source device, a first returned packet corresponding to the first probing packet and a second returned packet corresponding to the second probing packet;

construct a byte array based on the first returned packet and the second returned packet,
   wherein the byte array comprises a subarray, and
   wherein the subarray comprises a field indicative of the source device, a field indicative of an IP address associated with the first returned packet, and a field indicative of an IP address associated with the second returned packet; and based on the byte array, construct a bit array,
   wherein the bit array comprises a plurality of binary values corresponding to a plurality of IP addresses in the network, and
   wherein each binary value is indicative of whether a corresponding IP addresses is a router.

\* \* \* \* \*